US009208478B2

(12) United States Patent
Yamada et al.

(10) Patent No.: US 9,208,478 B2
(45) Date of Patent: Dec. 8, 2015

(54) POSTED MESSAGE PROVIDING SYSTEM, POSTED MESSAGE PROVIDING APPARATUS, POSTED MESSAGE PROVIDING METHOD, AND COMPUTER PROGRAM

(71) Applicants: Hideo Yamada, Okazaki (JP); Ryuya Muramatsu, Okazaki (JP)

(72) Inventors: Hideo Yamada, Okazaki (JP); Ryuya Muramatsu, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 262 days.

(21) Appl. No.: 13/644,785

(22) Filed: Oct. 4, 2012

(65) Prior Publication Data
US 2013/0117389 A1 May 9, 2013

(30) Foreign Application Priority Data
Nov. 3, 2011 (JP) ................. 2011-241770

(51) Int. Cl.
*G06F 15/16* (2006.01)
*G06Q 10/10* (2012.01)
*G08G 1/0967* (2006.01)
*H04W 4/04* (2009.01)
*G06Q 50/00* (2012.01)

(52) U.S. Cl.
CPC ............ *G06Q 10/107* (2013.01); *G06Q 50/01* (2013.01); *G08G 1/09675* (2013.01); *G08G 1/096775* (2013.01); *H04W 4/046* (2013.01)

(58) Field of Classification Search
None
See application file for complete search history.

(56) References Cited

U.S. PATENT DOCUMENTS

| 8,055,282 | B1* | 11/2011 | Ortega et al. ................. 455/465 |
| 2005/0221876 | A1* | 10/2005 | Van Bosch et al. ........ 455/575.9 |
| 2006/0015254 | A1* | 1/2006 | Smith ............................... 702/3 |
| 2006/0166644 | A1* | 7/2006 | Champion .................... 455/406 |
| 2007/0088490 | A1 | 4/2007 | Sutardja |
| 2007/0201378 | A1* | 8/2007 | Tarkiainen et al. ........... 370/252 |
| 2008/0077316 | A1* | 3/2008 | Yamane et al. ............... 701/119 |
| 2010/0255865 | A1* | 10/2010 | Karmarkar .................... 455/466 |
| 2011/0153183 | A1 | 6/2011 | Cohn et al. |

FOREIGN PATENT DOCUMENTS

JP  A-2006-65535  3/2006

OTHER PUBLICATIONS

Feb. 1, 2013 Office Action issued in EP 12 18 9282.

* cited by examiner

*Primary Examiner* — Chris Parry
*Assistant Examiner* — Stephen Houlihan
(74) *Attorney, Agent, or Firm* — Oliff PLC

(57) ABSTRACT

Posted message providing systems, apparatuses, methods, and programs obtain a message posted on a computer network by a poster and location information associated with the posted message. The systems, apparatuses, methods, and programs obtain a poster location history that includes the specific locations of the poster in the past obtained at predetermined intervals. The systems, apparatuses, methods, and programs correct the location information associated with the posted message based on a text of the obtained posted message and the obtained poster location history, and communicate the posted message based on the corrected location information.

19 Claims, 11 Drawing Sheets

F I G . 1
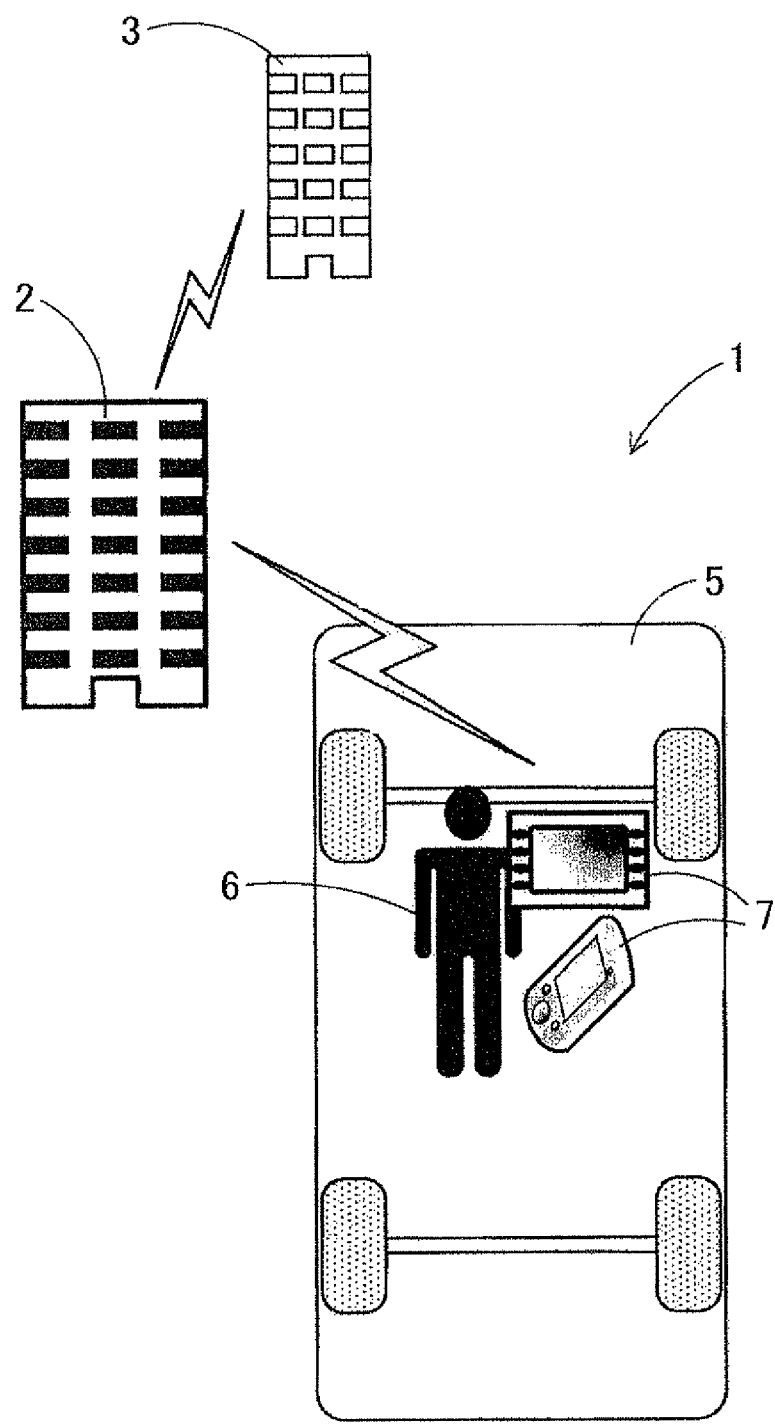

FIG. 3

POSTED MESSAGE INFORMATION

| POSTING TIME | POSTING LOCATION | USER ID | TEXT |
|---|---|---|---|
| 12:23 10/20/2011 | x1,y1 | abc111 | THERE IS RIGHT-TURN TRAFFIC JAM NEAR XX |
| 13:01 10/20/2011 | x2,y2 | def222 | ENJOYING MOUNTAIN CLIMBING |
| 13:08 10/20/2011 | x3,y3 | ghi333 | HEARD XX LINE HAS BEEN CANCELLED DUE TO HEAVY RAIN |
| ... | ... | ... | ... |

FIG. 4

POSTER LOCATION HISTORY DB

| USER ID | TIME | LOCATION COORDINATES |
|---|---|---|
| abc111 | 9:00:00 10/20/2011 | x11,y11 |
|  | 9:00:10 10/20/2011 | x12,y12 |
|  | 9:00:20 10/20/2011 | x13,y13 |
|  | ... | ... |
| dfh222 | 9:00:00 10/20/2011 | x21,y21 |
|  | 9:00:10 10/20/2011 | x22,y22 |
|  | 9:00:20 10/20/2011 | x23,y23 |
|  | ... | ... |
| ghi333 | ... | ... |
| ... | ... | ... |

POSTED MESSAGE PROVIDING SYSTEM, POSTED MESSAGE PROVIDING APPARATUS, POSTED MESSAGE PROVIDING METHOD, AND COMPUTER PROGRAM

INCORPORATION BY REFERENCE

The disclosure of Japanese Patent Application. No. 2011-241770, filed on Nov. 3, 2011, including the specification, drawings, and abstract is incorporated herein by reference in its entirety.

BACKGROUND

1. Related Technical Fields

Related technical fields include posted message providing systems, apparatuses, methods, and programs that provide messages posted on a computer network.

2. Related Art

In recent years, systems have been provided which allow the user to post messages on a computer network via a terminal and to view messages posted by other users. Examples of such systems include a blog, a social network service (SNS), Twitter®, and a chat (hereinafter collectively referred to as the "SNS etc."). Such posted messages include many posted messages stating traffic information such as information about traffic jams and road closures.

The SNS etc. is advantageous in that the user can quickly obtain the latest information. However, since the SNS etc. contains a huge amount of information, it is difficult to extract only the information required by the user viewing the posted messages. Thus, for example, Japanese Patent Application Publication No. 2006-65535 (JP 2006-65535 A) (pages 10 to 12, FIGS. 8 and 10) proposes an art in which location information representing the location of a poster at the time the poster posted a message is associated with the message posted by the user, and the message posted by the user and the location information are stored in a server. In this technique, the user viewing posted messages is provided with the posted message as well as the location information representing the location of the poster who posted the message.

SUMMARY

In the posted messages, the users often state the events they have encountered (e.g., a traffic jam, a car accident, etc. in the case where the user is traveling in a vehicle). However, the users do not necessarily actually post the messages at the timing they encounter the events. For example, the users often post the messages after the events they encountered are finished or after a certain period of time has passed since they encountered the events. As a result, in the case of providing the posted message as well as the location information of the poster at the time the poster posted the message as in Japanese Patent Application Publication No. 2006-65535 (JP 2006-65535 A), a location that is different from the location where the event contained in the posted message has actually taken place may be provided as the location of the poster who posted the message about the event. This reduces reliability of the information that is provided.

Exemplary implementations of the broad inventive principles described herein provide a posted message providing system, a posted message providing apparatus, a posted message providing method, and a computer program, which, in the case of associating location information with a message posted on a computer network, can correct the location information based on the text of the posted message and a location history of the poster, and thus can correct any mismatch between the text of the posted message and the location information associated with the posted message.

Exemplary implementations provide systems, apparatuses, methods, and programs that obtain a message posted on a computer network by a poster and location information associated with the posted message. The systems, apparatuses, methods, and programs obtain a poster location history that includes the specific locations of the poster in the past obtained at predetermined intervals. The systems, apparatuses, methods, and programs correct the location information associated with the posted message based on a text of the obtained posted message and the obtained poster location history, and communicate the posted message based on the corrected location information.

BRIEF DESCRIPTION OF THE DRAWINGS

FIG. 1 is a schematic configuration diagram showing a posted message providing system according to an example;

FIG. 3 is a diagram showing an example of posted message information that is stored in a posted message information database (DB) of a posted message information management center;

FIG. 4 is a diagram showing an example of a poster location history that is stored in a poster location history database (DB) of the posted message information management center;

DETAILED DESCRIPTION OF EXEMPLARY IMPLEMENTATIONS

Figure 2:
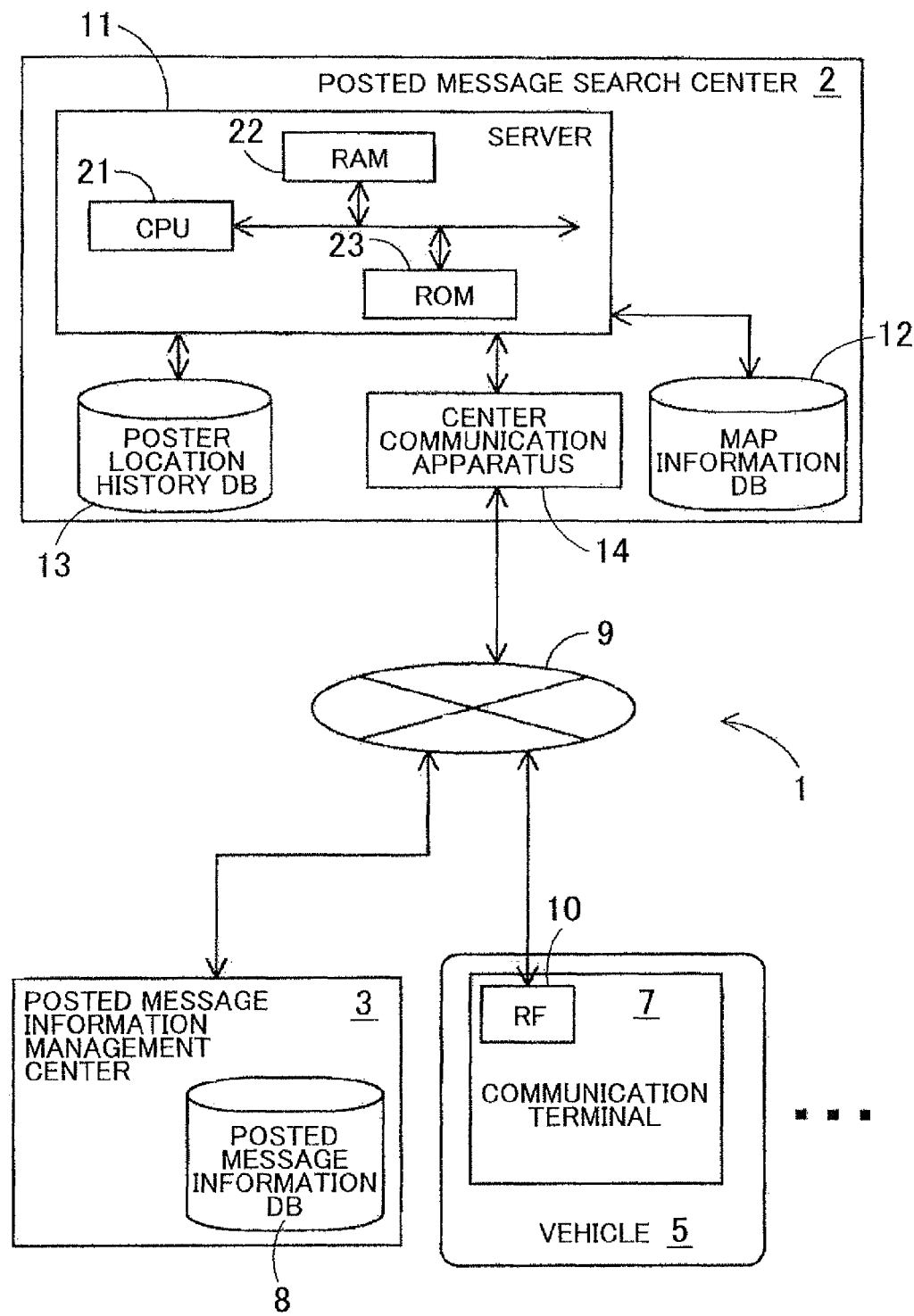
FIG. 2 is a block diagram showing a configuration of the posted message providing system according to the example.

An exemplary posted message providing system will be described in detail below with reference to the accompanying drawings. First, a schematic configuration of a posted message providing system 1 according to the present example will be described with reference to FIGS. 1 and 2. FIG. 1 is a schematic configuration diagram showing the posted message providing system 1 according to the present example. FIG. 2 is a block diagram showing a configuration of the posted message providing system 1 according to the present example.

As shown in FIG. 1, the posted message providing system 1 according to the present example is basically formed by a posted message search center 2 corresponding to the posted message providing apparatus, a posted message information management center 3, and a communication terminal 7 of a user 6 (corresponding to the poster who posts a message or the viewer who views posted messages) who rides in a vehicle 5 at various locations. Examples of the communication terminal 7 include a mobile phone, a personal digital assistant (PDA), a smart phone, a personal computer (PC), and a navigation device mounted on the vehicle 5. The user 6 may be traveling by transportation other than vehicles (e.g., a train, a bicycle, walking, etc.), or may not be traveling.

The posted message search center 2 is a center that corrects "location information representing the location of the poster at the time the poster posted the message (hereinafter referred to as the 'posting location information')," which is associated with the message posted by the user 6 via the communication terminal 7, to information representing a location according to the text of the posted message, and transmits the corrected location to the posted message information management center 3. When the user requests access to posted messages, the posted message search center 2 also extracts from the posted messages stored in the posted message information management center 3 those posted messages corresponding to search conditions that have been set by the user 6, and delivers information about the extracted posted messages to the communication terminal 7 of the user 6. The posted message search center 2 will be described in detail below.

The posted message information management center 3 is a center that manages blogs, social network services (SNS), Twitter®, chats, etc. (hereinafter referred to as the "SNS etc."), and stores and provides messages posted on a computer network by the user 6 via the SNS etc. The user 6 can also post messages by a fixed communication terminal in addition to the portable communication terminal 7. The posted message information management center 3 has a posted message information database (DB) 8 as a storage medium, and posted messages are sequentially stored in the posted message information DB 8. The text of each posted message as well as the posing time the message was posted, the posting location information, the poster's identification (ID), etc. are stored in the posted message information DB 8. FIG. 3 is a diagram showing an example of posted messages that are collected and provided by the posted message information management center 3. As shown in FIG. 3, each posted message includes the posting time, the posting location information, the user ID, the text of the posted message, etc. Information about posted messages posted from the users 6 across the country is cumulatively stored in the posted message information DB 8 of the posted message information management center 3. If the amount of stored data reaches a predetermined amount or more, the information about the past posted messages is sequentially deleted in chronological order from the oldest information.

The posted message search center 2 and the posted message information management center 3 are connected to a communication network 9 via communication equipment so that two-way communication can be established therebetween.

The communication terminal 7 is an information communication terminal of the user 6, which has a function allowing the user 6 to compose a message and to post the message to the posted message information management center 3, and a function allowing the user 6 to access posted messages posted from other communication terminals etc. and stored in the posted message information management center 3. Examples of the communication terminal 7 include a mobile phone, a PDA, a smart phone, a PC, and a navigation device mounted on the vehicle 5. The communication terminal 7 further has a function to specify a current location of the communication terminal 7 (i.e., a current location of the user 6 as a poster), such as a global positioning system (GPS), a navigation function, etc. The navigation function allows a map image around the current location of the communication terminal 7 (the user 6) to be displayed based on map data obtained from a server or stored in a memory, allows the current location of the communication terminal 7 (the user 6) to be displayed on the displayed map image, and can search for a route to a set destination and provide directions to the destination. The communication terminal 7 is connected to the communication network 9 via a transmitting/receiving circuit section (RF) 10, described later, so as to be able to establish two-way communication with the posted message search center 2. Not every communication terminal 7 need have the function to specify the current location of the communication terminal 7 and the navigation function. According to this example the communication terminal 7 that posts a message has the function to specify its current location such as the GPS, and the communication terminal 7 that accesses posted messages has the function to display the map image around the current location. The communication terminal 7 will be described in detail later.

The configuration of the posted message search center 2 of the posted message providing system 1 will be described below in more detail with reference to FIG. 2. As shown in FIG. 2, the posted message search center 2 is basically formed by a server 11, a map information database (DB) 12 and a poster location history database (DB) 13 as an information recording unit connected to the server 11, and a center communication apparatus 14.

Figure 6:
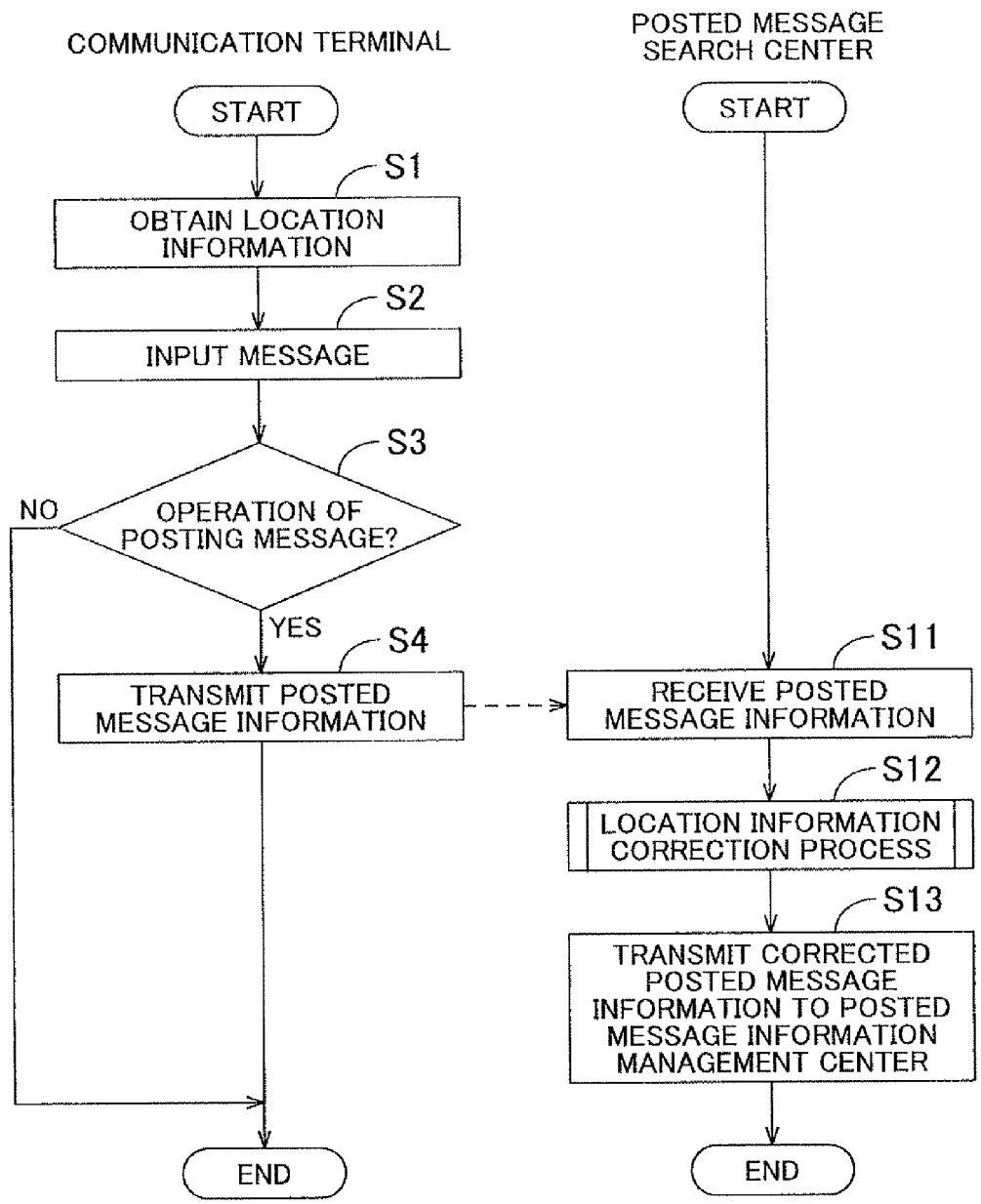
FIG. 6 is a flowchart of a posted message information correction algorithm according to the example.

As shown in FIG. 2, the server 11 is an electronic control unit that performs various controls in the posted message search center 2. The server 11 includes a central processing unit (CPU) 21 as an arithmetic unit and a controller, and an internal storage medium such as a random access memory (RAM) 22 and a read only memory (ROM) 23. (Note: the term "storage medium" as used herein is not intended to encompass transitory signals.) The RAM 22 is used as a working memory when the CPU 21 performs various arithmetic operations. The ROM 23 stores a posted message information correction program (FIGS. 6 and 7), a poster location information obtaining program (FIG. 10), a posted message providing program (FIG. 11), etc. in addition to various control programs. The server 11 forms various units as a processing algorithm. For example, the posted message information obtaining unit obtains a message posted by a poster on the computer network, and location information of the poster at the time the poster posted the message, which is stored in association with the posted message. The poster location history obtaining unit obtains a poster location history as a history of a specific result in which the location of the poster who posted the message is specified at predetermined intervals. The location information correcting unit corrects the location information associated with the posted message, based on the text of the posted message obtained by the posted message information obtaining unit and the poster location history. The search condition obtaining unit obtains search conditions of the posted message. The searching unit extracts from the posted messages on the computer network those posted messages corresponding to the search conditions obtained by the search condition obtaining unit (the corresponding posted messages). The providing unit provides the corresponding posted messages extracted by the searching unit, based on the posting location information corrected by the location information correcting unit.

The map information DB 12 is a memory unit that stores map information. The map information stored in the map information DB 12 includes various information required for route search and map display, including a road network. For example, the map information is formed by link data about roads (links), node data about node points, route data about railway routes, facility data about facilities, intersection data about intersections, search data that is used to search for a route, search data that is used to retrieve a point, map display data that is used to display a map, etc. The map information DB 12 is regularly updated with new map information.

The poster location history DB 13 is a memory unit that stores a history of a specific result in which the current location of each communication terminal 7 located across the country (that is, the current location of the user 6 who has the communication terminal 7) is specified at predetermined intervals (hereinafter this history is referred to as the "poster location history"). In the posted message providing system 1 according to the present example, information about current location coordinates of the communication terminal 7 detected by the user ID, the UPS, etc. is transmitted from each communication terminal 7 to the posted message search center 2 at predetermined time intervals (e.g., every 10 seconds), and is cumulatively stored in the poster location history DB 13. FIG. 4 is a diagram showing an example of the poster location history that is stored in the poster location history DB 13. As shown in FIG. 4, the poster location history is formed by the user ID, the time, and the location coordinates of the communication terminal 7 (the user 6) at each time. Information about the current locations of the communication terminals 7 (the users 6) located across the country is cumulatively stored in the poster location history DB 13. If the amount of stored data reaches a predetermined amount or more, the past information is sequentially deleted in chronological order from the oldest information.

The center communication apparatus 14 is a communication apparatus that establishes communication with the posted message information management center 3 and the communication terminal 7 via the communication network 9. In the present example, the center communication apparatus 14 transmits and receives information about the search conditions and the posted messages to and from the posted message information management center 3 and the communication terminal 7 via the communication network 9.

Figure 5:
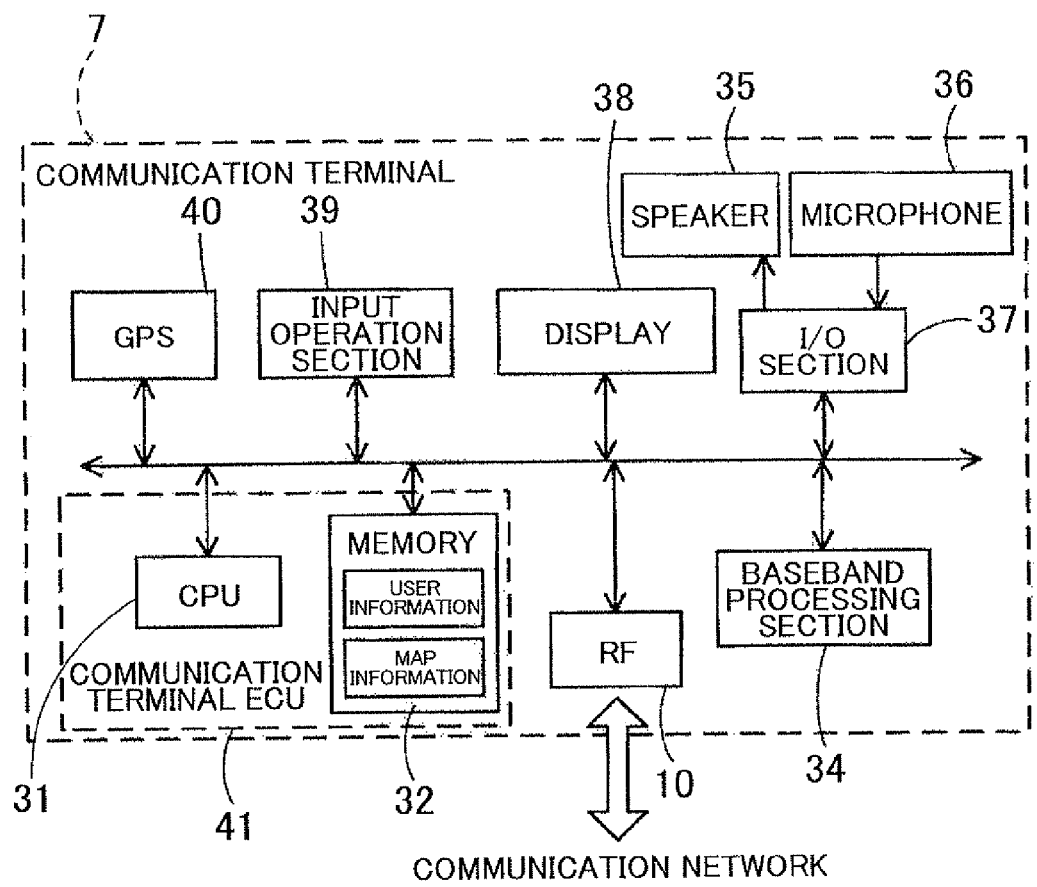
FIG. 5 is a block diagram schematically showing a control system of a communication terminal according to the example.

A schematic configuration of the communication terminal 7 of the user 6 will be described below with reference to FIG. 5. FIG. 5 is a block diagram schematically showing a control system of the communication terminal 7 according to the present example.

As shown in FIG. 5, the communication terminal 7 is formed by connecting to a data bus BUS a CPU 31, a storage medium (e.g., memory 32), a transmitting/receiving circuit section (RF) 10, a baseband processing section 34, an input/output (I/O) section 37, a display 38, an input operation section 39, and a GPS 40. The memory 32 stores user information (the user ID, user's name, etc.) about the user 6 who has the communication terminal 7, map information, etc. The transmitting/receiving circuit (RF) 10 transmits and receives a signal to and from a base station of the communication network 9. The baseband processing section 34 converts a radio frequency (RF) signal received by the transmitting/receiving circuit section 10 to a baseband signal, and converts a baseband signal to an RF signal. The I/O section 37 serves as an interface with a speaker 35, a microphone 36, etc. The display 38 is formed by a liquid crystal display panel etc., and the input operation section 39 is formed by a touch panel, a keyboard, etc.

The CPU 31 contained in the communication terminal 7 is a controller of the communication terminal 7 which performs various operations according to an operation program stored in the memory 32. The CPU 31 together with the memory 32 forms a communication terminal electronic control unit (ECU) 41. Various processing operations of the communication terminal ECU 41 are displayed on the display 38 as required.

The memory 32 is a storage medium that stores the posted message information correction program (FIGS. 6 and 7), the poster location information obtaining program (FIG. 10), the posted message providing program (FIG. 11), etc. in addition to the user information (the user ID, the user's name, etc.) about the user 6 who has the communication terminal 7, and the map information. The map information need not necessarily be stored in the memory 32, and may be obtained from the server via communication. The memory 32 may be formed by a hard disc, a memory card, an optical disc such as a compact disc (CD) or a digital versatile disc (DVD), etc.

The memory 32 further stores information about the posted messages received from the posted message search center 2. When the communication terminal 7 requests access to the posted messages, the posted message search center 2 extracts from the posted messages stored in the posted message information management center 3 those posted messages corresponding to the search conditions that have been set in the communication terminal 7, and delivers information about the extracted posted messages to the communication terminal 7. The memory 32 further stores the posting time each message was posted, the posting location information, the poster's ID, etc. together with the text of the posted message.

The display 38 is provided on one face of a housing, and a liquid crystal display, an organic electroluminescence (EL) display, etc. is used as the display 38. Various information such as data that is input by the input operation section 39, Internet sites, etc. is displayed on the display 38. When performing the navigation function, a map image including roads, traffic information, a planned travel route from a departure point to a destination, guidance information along the planned travel route, etc. are also displayed on the display 38. In the communication terminal 7 of the present example, information about the posted messages received from the posted message search center 2 (the text of each posted message, the poster's ID, the posting location information, etc.) is also displayed on the display 38.

The input operation section 39 is formed by a touch panel provided on the front face of the display 38. The communication terminal ECU 41 performs control to carry out corresponding various operations, based on an electric signal that is output in response to pressing on the touch panel etc. In the present example, the input operation section 39 is operated when posting a message or when inputting the search conditions of the posted messages. The input operation section 39 may be formed by various keys such as character input keys, a cursor key that is used to move a cursor to select displayed data, and an Enter key that is used to confirm user's selection, etc.

The GPS 40 is capable of receiving radio waves from artificial satellites to detect the current location of the communication terminal 7 (that is, the user 6) and the current time.

Next, the posted message information correction method will be described with reference to algorithm shown in FIGS. 6, 7, 10, and 11. The algorithm may be implemented in the form of one or more computer programs that is stored in one or more storage mediums included in the posted message search center 2 and the communication terminal 7, and executed by the CPUs 31 and 21. Although the structure of the above-described posted message search center 2 and the communication terminal 7 is referenced in the description of the process, the reference to such structure is exemplary, and the method need not be limited by the specific structure of the display device 1.

The posted message information correction method corrects the "posting location information representing the location of the poster at the time the poster posted the message," which is associated with the message posted by the user 6 via the communication terminal 7, to information representing a location according to the text of the posted message, and transmits the corrected location to the posted message information management center 3.

First, the posted message information correction program that is executed in the communication terminal 7 will be described.

In step (hereinafter abbreviated as "S") 1, the CPU 31 obtains the current location of the communication terminal 7 (that is, the current location of the user 6 who posts a message) based on the detection result of the GPS 40.

Next, in S2, the CPU 31 obtains the text of the message that has been input by the user 6, based on the operation of the user 6 which has been received by the input operation section 39. Examples of the text of the input message include texts stating an event the user 6 has encountered (e.g., a traffic condition such as a traffic jam or a traffic accident in the case where the user is traveling in a vehicle) or an action the user 6 has taken (e.g., a vehicle travel status in the case where the user is traveling in a vehicle).

Then, in S3, the CPU 31 determines if a predetermined operation of posting the input message has been performed by the input operation section 39.

If it is determined that the predetermined operation of posting the input message has been performed by the input operation section 39 (S3: YES), the routine proceeds to S4. If it is determined that the predetermined operation of posting the input message has not been performed by the input operation section 39 (S3: NO), the posted message information correction program is terminated.

In S4, the CPU 31 transmits the information about the posted message (hereinafter referred to as the "posted message information"), including the current location of the communication terminal 7 obtained in S1 and the text of the message obtained in S2, to the posted message search center 2. The posted message information includes the posting time the poster posted the message, the poster's ID, etc., in addition to the text of the posted message and the current location of the communication terminal 7 (the posting location information representing the location of the poster at the time the poster posted the message). As described below, after receiving the posted message information, the posted message search center 2 corrects particularly the posting location information representing the location of the poster, which is included in the received posted message information, to information representing a location according to the text of the posted message, and transmits the corrected location to the posted message information management center 3.

The posted message information correction program that is executed in the posted message search center 2 will be described below.

First, in S11, the CPU 21 receives the posted message information from the communication terminal 7 that posted the message.

Next, in step S12, the CPU 21 executes a location information correction process (FIG. 7) described below. The location information correction process is a process in which particularly the posting location information representing the location of the poster, which is included in the posted message information obtained in S11, is corrected to information representing a location according to the text of the posted message, based on the text of the corresponding posted message and the location history of the poster.

Figure 11:
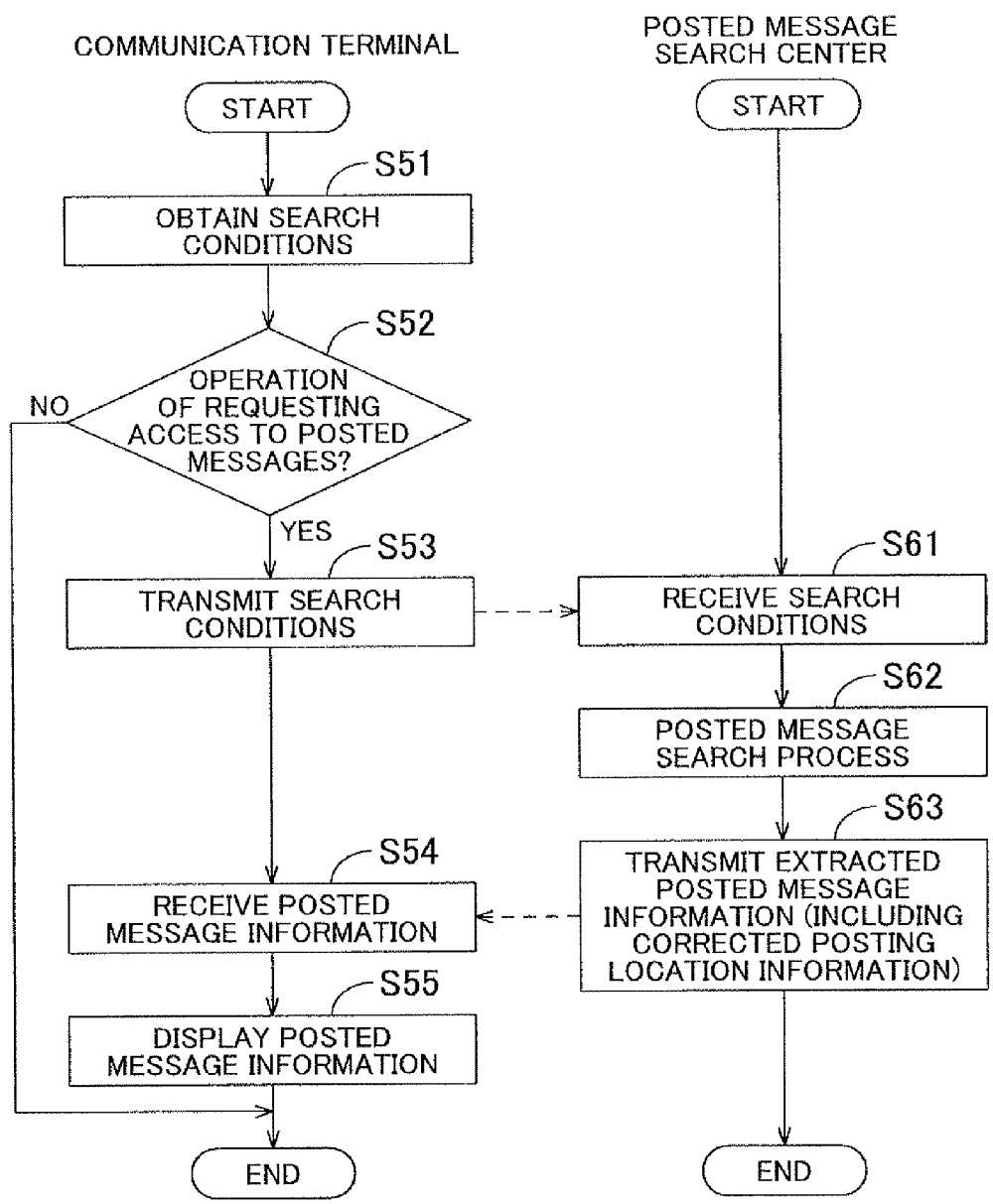
FIG. 11 is a flowchart of a posted message providing algorithm according to the example.

Then, in step S13, the CPU 12 transmits the posted message information obtained in S11 to the posted message information management center 3. Regarding the posting location information, the CPU 12 transmits the corrected posting location information produced in the location information correction process in S12 to the posted message information management center 3. The posted message information management center 3 sequentially stores the transmitted posted message information in the posted message information DB 8 (see FIG. 3). As described below, if the communication terminal 7 requests access to the posted messages, the posted message information management center 3 delivers corresponding posted message information out of the posted message information stored in the posted message information DB 8 to the requesting communication terminal 7 (FIG. 11).

Figure 7:
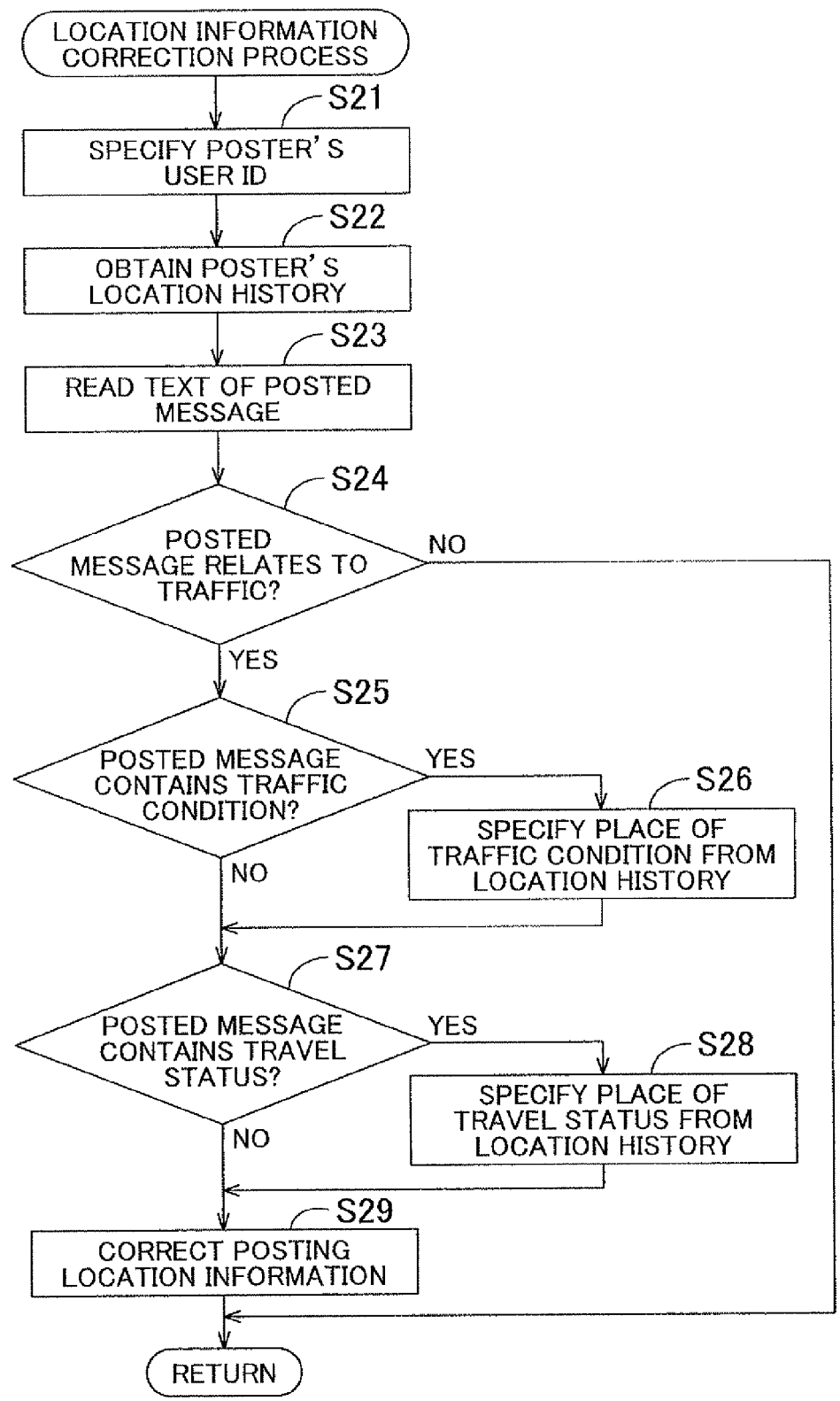
FIG. 7 is a flowchart of a sub-process algorithm of a location information correction process according to the example.

A sub-process of the location information correction algorithm that is executed in S12 will be described below with reference to FIG. 7. FIG. 7 is a flowchart of a sub-process program of the location information correction process.

First, in S21, the CPU 21 specifies the poster who posted the message by the user ID contained in the posted message information, based on the posted message information received from the communication terminal 7 in S11.

Next, in S22, the CPU 21 obtains the location history of the poster specified in S21. In the posted message providing system 1 of the present example, information about the current location coordinates of the communication terminal 7 detected by the user ID, the GPS, etc. is transmitted from each communication terminal 7 to the posted message search center 2 at predetermined time intervals (e.g., every 10 seconds) in the poster location information obtaining program (FIG. 10) described below, and is cumulatively stored in the poster location history DB 13 (FIG. 4). Thus, in S22, the CPU 21 extracts the location history of the poster specified in S21 from the location histories stored in the poster location history DB 13, and thus obtains the location history of the poster specified in S21. The location history to be obtained in S22 is the location history up until a predetermined time (e.g., 30 minutes) ago before the time the poster posted the message.

Then, in S23, the CPU 21 reads the text of the posted message from the posted message information received from the communication terminal 7 in S11.

Then, in S24, the CPU 21 determines if the posted message is a message stating information about traffic, based on the text of the posted message read in S23. Specifically, if the text of the posted message contains a word relating to traffic, it is determined that the posted message is a message stating information about traffic. Examples of the word relating to traffic include words representing a name of a railway route, a type of railway route, a name of a train, a name of a station, a name of a road, a type of road, a name of a specific facility such as an interchange or a rest area, a traffic condition such as train cancellation, a traffic jam, or a road closure, and a travel status of a vehicle or a train. Note that the term "word" refers to a combination of words, a single word, etc.

If it is determined that the posted message read in S23 is a message stating information about traffic (S24: YES), the routine proceeds to S25. If it is determined that the posted message read in S23 is not a message stating information about traffic (S24: NO), the routine proceeds to S13 without correcting the posting location information.

In S25, the CPU 21 determines if the text of the posted message read in S23 contains a word relating to a traffic condition. Examples of the word relating to a traffic condition include train cancellation, a traffic jam, a road closure, and a traffic accident.

If it is determined that the text of the posted message read in S23 contains a word relating to a traffic condition (S25: YES), the routine proceeds to S26. If it is determined that the text of the posted message read in S23 does not contain a word relating to a traffic condition (S25: NO), the routine proceeds to S27.

Figure 8:
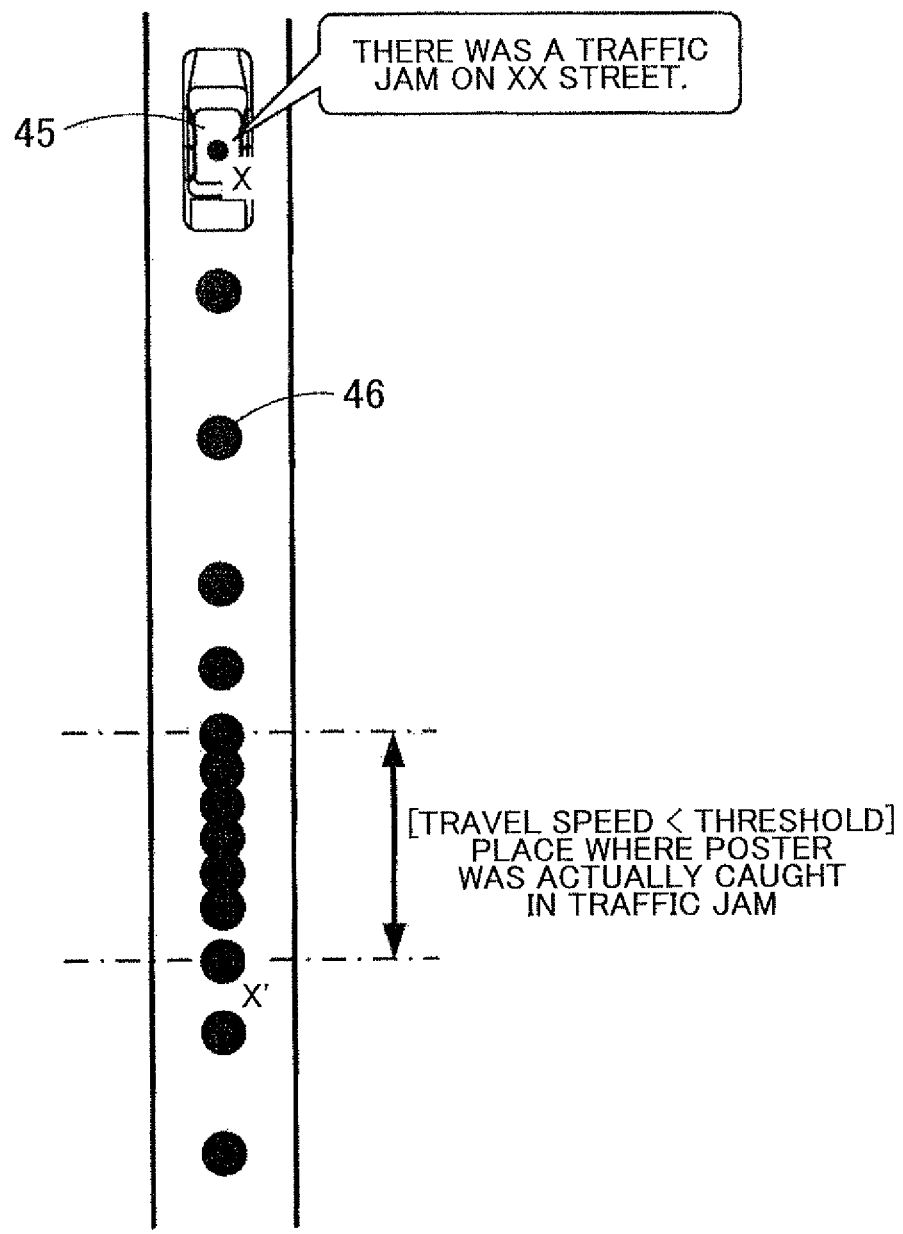
FIG. 8 is a diagram illustrating a method for correcting posting location information in the case where a posted message contains a word relating to a traffic condition.

In S26, the CPU 21 specifies the place where the poster encountered the traffic condition contained in the text of the posted message, based on the location history of the poster obtained in S22. FIG. 8 illustrates an example in which the text of the posted message contains the word "traffic jam" as a word relating to a traffic condition. In the example of FIG. 8, a poster 45 posted a message after getting through a traffic jam, and the place where the poster 45 was caught in the traffic jam needs to be specified from a location history 46 of the poster 45. As described above, the location history 46 represents the locations of the poster 45 obtained at predetermined time intervals. Thus, the travel speed of the poster 45 can be calculated from the distance intervals of the location history 46. Accordingly, an area where the calculated travel speed is less than a predetermined threshold value (e.g., 10 km/h on local roads and 40 km/h on highways) is specified as an area of the traffic jam (that is, the place where the poster encountered the traffic condition).

Even if the text of the posted message contains other traffic condition, the place where the poster encountered this traffic condition is similarly specified based on the location history of the poster. Then, the routine proceeds to S27.

In S27, the CPU 21 determines if the text of the posted message read in S23 contains a word relating to a travel status. Examples of the word relating to a travel status includes right turn, left turn, travel straight, travel backward, stop, and parking.

If it is determined that the text of the posted message read in S23 contains a word relating to a travel status (S27: YES), the routine proceeds to S28. If it is determined that the text of the posted message does not contain a word relating to a travel status (S27: NO), the routine proceeds to S29.

Figure 9:
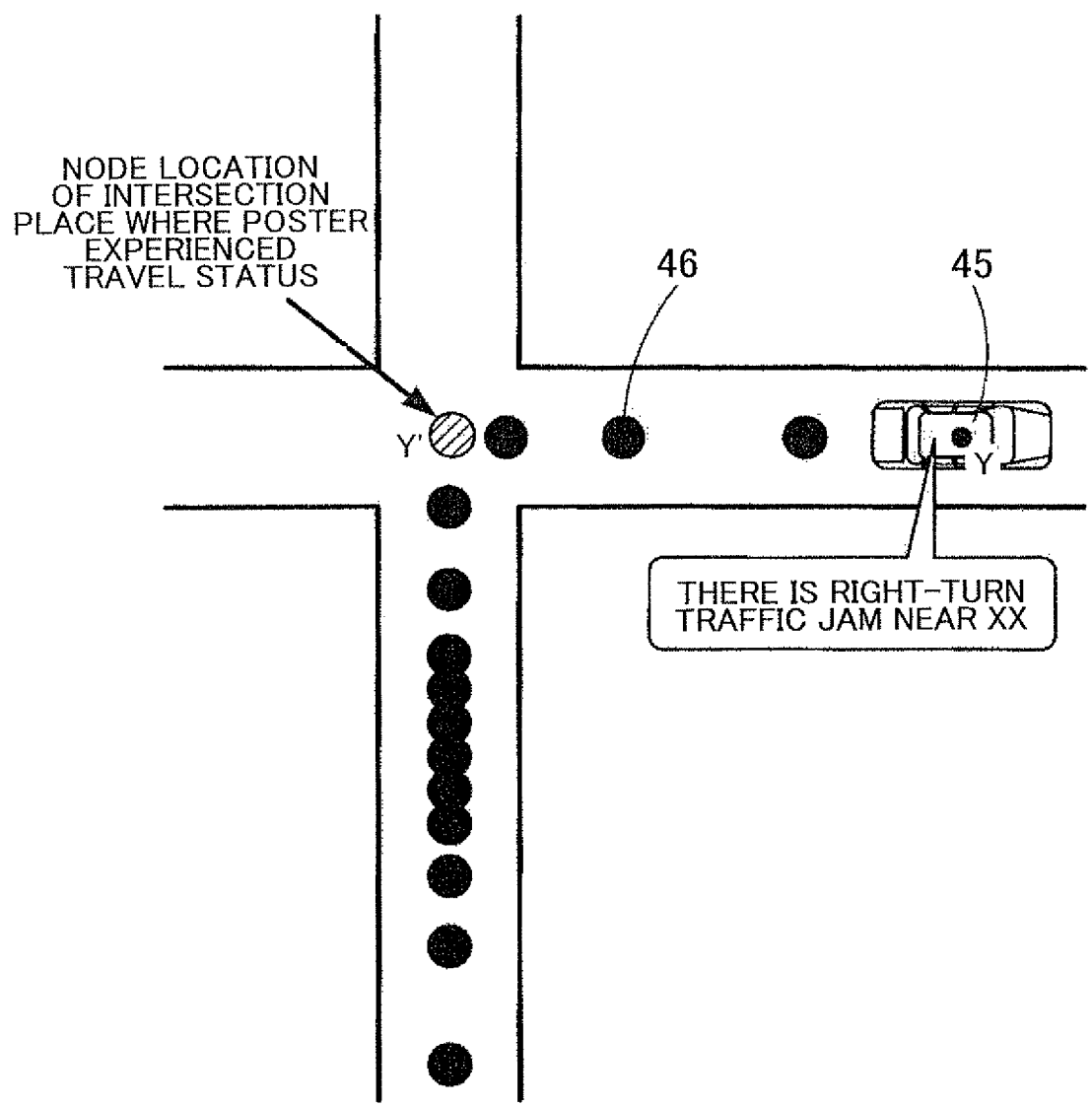
FIG. 9 is a diagram illustrating a method for correcting posting location information in the case where a posted message contains a word relating to a travel status.

In S28, the CPU 21 specifies the place where the poster experienced traveling corresponding to the travel status contained in the text of the posted message, based on the location history of the poster obtained in S22. FIG. 9 illustrates an example in which the text of the posted message contains the word "right turn" as a word relating to a travel status. In the example of FIG. 9, the poster 45 posted the message after the vehicle of the poster 45 turned right at an intersection, and the place where the vehicle of the poster 45 turned right needs to be specified from the location history 46 of the poster 45. As described above, the location history 46 represents the locations of the poster 45 obtained at predetermined time intervals. Thus, the location of the intersection where the vehicle of the poster 45 turned right immediately before the poster 45 posted the message can be specified by comparing the location history 46 with map data obtained from the map information DB 12. Accordingly, the node location of the specified intersection is specified as the place where the poster 45 experienced traveling corresponding to the travel status.

Even if the text of the posted message contains other travel status, the place where the poster experienced traveling corresponding to this travel status is similarly specified based on the location history of the poster. Then, the routine proceeds to S29.

In S29, the CPU 21 corrects the posting location information associated with the posted message received from the communication terminal 7 in S11 to the information representing the location specified in S26 or S28.

For example, in the example of FIG. 8, the posting location information is corrected from information representing a location X where the poster 45 actually posted the message to information representing a location X' as the place where the poster 45 encountered the traffic condition (the traffic jam in FIG. 8) contained in the text of the posted message. In the case where the place where the poster encountered the traffic condition is specified not as a point but as an area like a traffic jam, the posting location information is corrected to information representing a location where the vehicle of the user entered the area where the poster encountered the traffic condition."

In the example of FIG. 9, the posting location information is corrected from information representing a location Y where the poster 45 actually posted the message to information representing a location Y' as the place where the poster 45 experienced traveling corresponding to the travel status (right turn in FIG. 9) contained in the text of the posted message.

The above configuration allows a more proper location of the poster according to the text of the posted message to be shown without causing a significant mismatch between the text of the posted message and the location of the poster, when guiding the posted message information on the communication terminal 7 as described below (see FIG. 12). The above configuration can also avoid inconsistency between the text of the posted message and the location of the poster which are displayed. The above configuration also allows the user to easily know which area the poster talks about in the posted message.

In the case where the posted message contains both a word relating to a traffic condition and a word relating to a travel status, the posting location information may be corrected to information representing a plurality of locations specified in S26 and S28, or may be corrected to information representing one location that is prioritized. The location to be prioritized may be set in advance (e.g., the travel status may be prioritized) or may be determined based on the context of the posted message.

Figure 10:
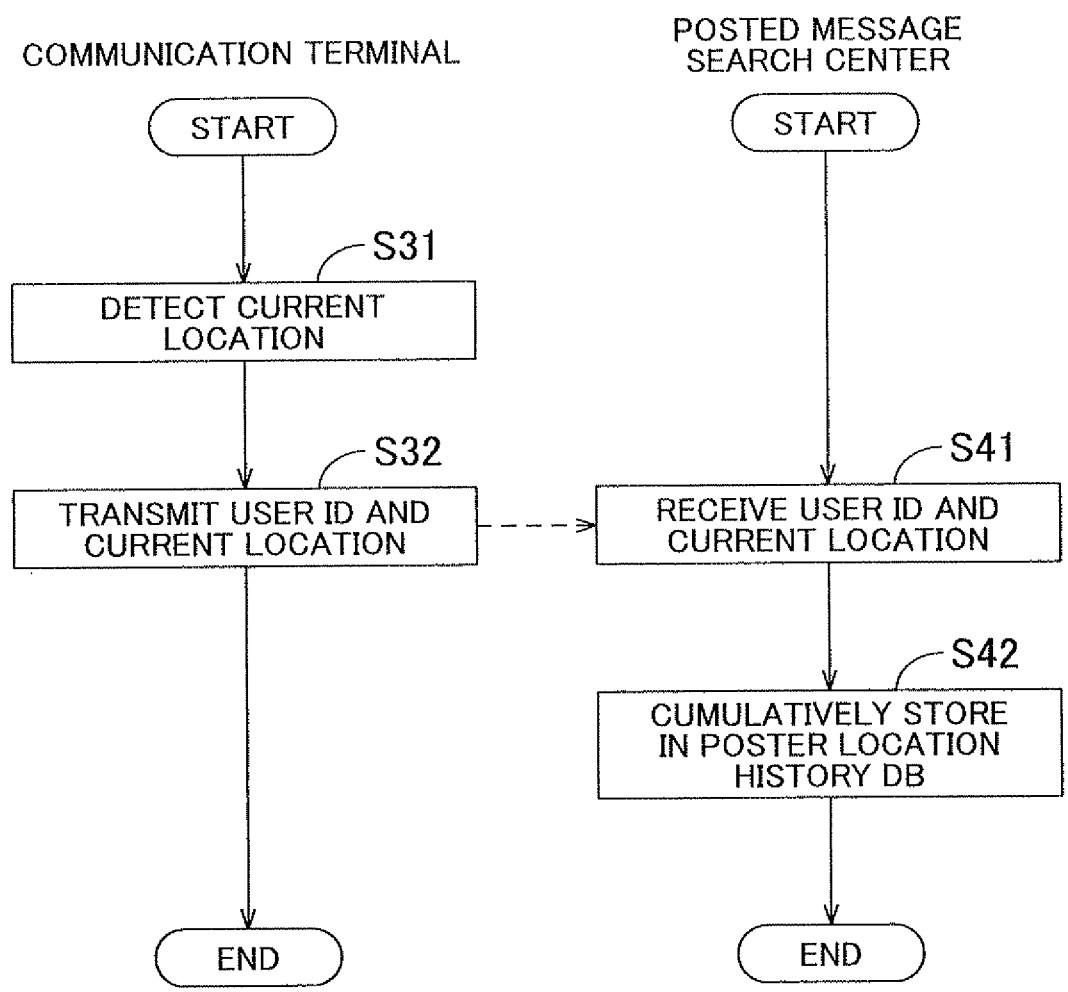
FIG. 10 is a flowchart of a poster location information obtaining algorithm according to the example.

The poster location information obtaining algorithm that can be executed as one or more programs in the communication terminal 7 and the posted message search center 2 of the posted message providing system 1 will be described below with reference to FIG. 10. FIG. 10 is a flowchart of the poster location information obtaining program according to the present example. The poster location information obtaining program is a program that is executed at predetermined intervals (e.g., every 10 seconds) after the power of the communication terminal 7 is turned on, and that transmits information about the current location of the communication terminal 7 (that is, the current location of the user 6 who has the communication terminal 7) to the posted message search center 2.

First, the poster location information obtaining program that is executed in the communication terminal 7 will be described.

In S31, the CPU 31 obtains the current location of the communication terminal 7 (that is, the current location of the user 6 who has the communication terminal 7) based on the detection result of the GPS 40.

Next, in S32, the CPU 31 transmits information about the current location of the communication terminal 7 obtained in S31 and the user ID specifying the user and stored in the memory 32 of the communication terminal 7 (hereinafter this information is referred to as the "current location information) to the posted message search center 2.

The poster location information obtaining program that is executed in the posted message search center 2 will be described below.

First, in S41, the CPU 21 receives the current location information from the communication terminal 7.

Then, in S42, the CPU 21 sequentially stores the current location information received in S41 in the poster location history DB 13 (FIG. 4). As a result, a history of a specific result in which the current location of each communication terminal 7 located across the country (that is, the current location of each user 6 having the communication terminal 7) is specified at predetermined intervals (the "poster location history") is stored in the poster location history DB 13. If the amount of data stored in the poster location history DB 13 reaches a predetermined amount or more, the past information is sequentially deleted in chronological order from the oldest information. As described above, in the posted message information correction program (FIGS. 6 and 7), the posting location information is corrected based on the poster location history stored in the poster location history DB 13.

The posted message providing algorithm that can be executed as a one or more programs in the communication terminal 7 and the posted message search center 2 of the posted message providing system 1 will be described below with reference to FIG. 11. FIG. 11 is a flowchart of the posted message providing program according to the present example. The posted message providing program is a program that is executed after a predetermined operation is performed in the communication terminal 7, and that, in response to a user's request to access the posted messages, extracts from the messages posted on the computer network those posted messages corresponding to the search conditions that have been set in the communication terminal 7, and provides the communication terminal 7 with the information about the extracted posted messages.

First, the posted message providing program that is executed in the communication terminal 7 will be described.

In S51, the CPU 31 obtains the search conditions for retrieving the posted messages, based on the operation of the user which has been received by the input operation section 39. Specifically, the CPU 31 obtains as the search conditions for retrieving the posted messages the search conditions that have been input by the input operation section 39 on a search condition input screen displayed on the display 38.

Next, in S52, the CPU 31 determines if a predetermined operation of requesting access to the posted messages has been performed in the input operation section 39.

If it is determined that the predetermined operation of requesting access to the posted messages has been performed in the input operation section 39 (S52: YES), the routine proceeds to S53. If it is determined that the predetermined operation of requesting access to the posted messages has not been performed in the input operation section 39 (S52: NO), the posted message providing program is terminated.

In S53, the CPU 31 transmits the search conditions obtained in S51 to the posted message search center 2. As described below, after receiving the search conditions, the posted message search center 2 extracts those posted messages corresponding to the search conditions from the messages posted on the computer network, based on the received search conditions (S62).

Then, in S54, the CPU 31 receives information about the posted messages transmitted from the posted message search center 2. The information about the posted messages received in S54 is the information about the posted messages extracted from the messages posted on the computer network based on the search conditions transmitted in S53, namely the information about the posted messages corresponding to the search conditions (the corresponding posted messages). The information about the posted messages includes the texts of the posted messages, the posting times the posted messages were posted, the posting location information, the posters' IDs, etc.

Then, in S55, the CPU 31 displays on the display 38 the information about the posted messages received in S54. The displayed information may be all of the texts of the posted messages, the posting times the posted messages were posted, the posting location information, and the posters' IDs, or maybe at least one of the texts of the posted messages, the posting times the posted messages were posted, the posting location information, and the posters' IDs. However, at least the texts of the posted messages are displayed. In the case where the posting location information is displayed, the posting location information corrected by the location information correction process in S12 is displayed.

Figure 12:
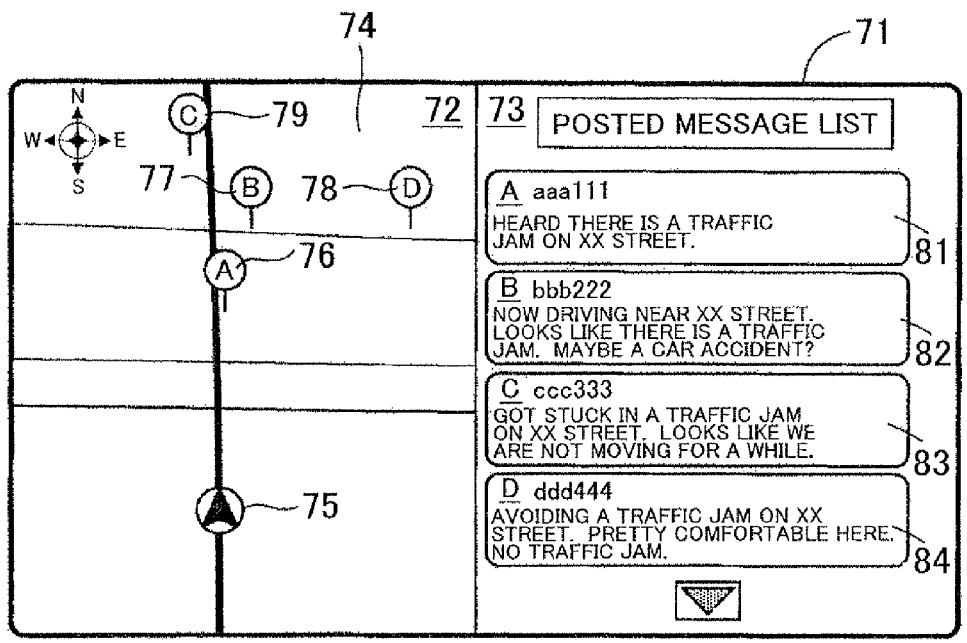
FIG. 12 is a diagram showing a posted message guidance screen displayed on a display in step 55.

FIG. 12 is a diagram showing a posted message guidance screen 71 that is displayed on the display 38 in S55. As shown in FIG. 12, the posted message guidance screen 71 is formed by two display regions, namely a left screen 72 that displays a map around the communication terminal 7 (the user 6), and a right screen 73 that displays the information about the posted messages.

The left screen 72 is formed by a map image 74 around the communication terminal 7 (the user 6), a current location mark 75 representing the current location of the communication terminal 7 (the user 6), and posting location marks 76 to 79 representing the posting locations of the displayed posted messages (the locations specified by the posting location information).

Figure 13:
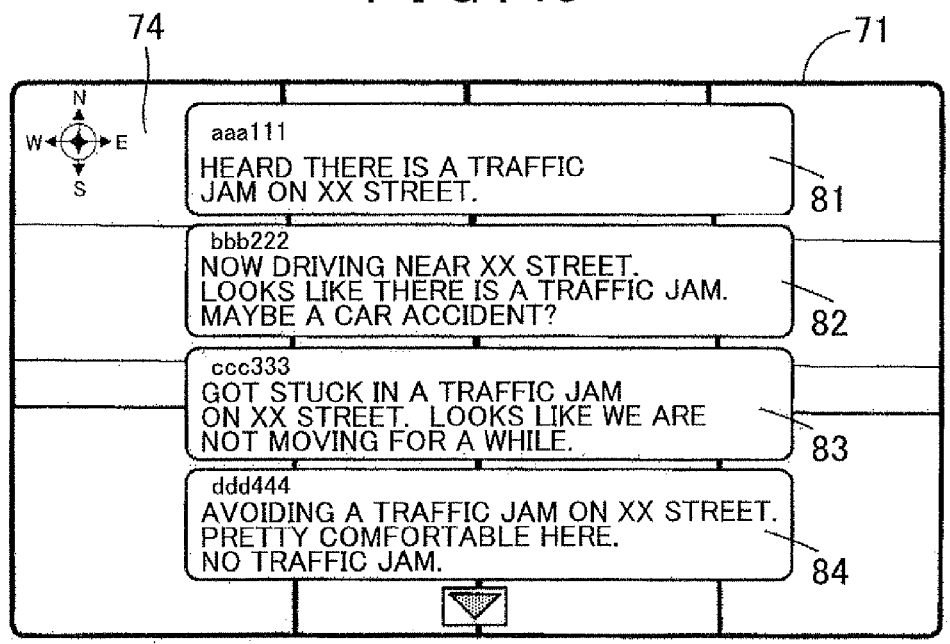
FIG. 13 is a diagram showing another display form of the posted message guidance screen.

The right screen 73 includes information display spaces 81 to 84 that display information about the posted messages. Each information display screen 81 to 84 displays the ID of the poster who posted the message, and the text of the posted message. As shown in FIG. 13, the posted message guidance screen 71 may be configured so that the information display spaces 81 to 84 are arranged on the entire screen. The posted message guidance screen 71 may be configured so that each information display space 81 to 84 is displayed in response to pressing of a predetermined icon displayed on the display 38. In the case where there are many posted messages, the posted message guidance screen 71 is desirably configured so that the posted messages can be scrolled through to allow the user to look at all the posted messages. When displaying the information about the posted messages, the message posted near the location of the communication terminal 7 (the user 6) may be preferentially displayed. Alternatively, the posted message that has been determined to match the search conditions to a great extent may be displayed preferentially.

The user can access the texts of the posted messages stating information desired by the user (e.g., information about traffic jams, road closures, etc.), by visually checking the posted message guidance screen 71 shown in FIGS. 12 and 13. This allows the user to obtain the information associated with the user at an earlier timing. Moreover, in the case of displaying the posting location information, the posting location information corrected by the location information correction process in S12 is displayed. This allows a more proper location of the poster according to the text of the posted message to be shown without causing a significant mismatch between the text of the posted message and the location of the poster.

The posted message providing program that is executed in the posted message search center 2 will be described below.

First, in S61, the CPU 21 receives the search conditions transmitted from the communication terminal 7 requesting access to the posted messages.

Next, in S62, the CPU 21 performs a search process of retrieving from the messages posted on the computer network those posted messages corresponding to the search conditions (the corresponding posted messages) by using the search conditions obtained in S61. Specifically, the CPU 21 extracts the information about the corresponding posted messages from the posted message information (FIG. 3) stored in the posted message information DB 8 of the posted message information management center 3. As described above, the search conditions may be the conditions designating the posting time or the posting location in addition to a search word.

Then, in S63, the CPU 21 transmits the information about the corresponding posted messages (including the posting location information) extracted in S62 to the communication terminal 7 requesting access to the posted messages. Regarding the posting location information, the CPU 21 transmits the posting location information corrected by the location information correction process in S12. As a result, the information about the posted messages stating the information desired by the user (e.g., information about traffic jams, road closures, etc.) is displayed on the communication terminal 7 requesting access to the posted messages (S55). Regarding the posting location information, the proper location information obtained by the correction is displayed on the communication terminal 7.

As described in detail above, in the posted message providing system 1 according to the present example, the posted message providing method of the posted message providing system 1, and the computer program that is executed by the posted message providing system 1, in the case where a message was posted on the computer network from the communication terminal 7, the poster location history, which is a history of a specific result in which the location of the poster who posted the message is specified at predetermined intervals, is obtained (S22), the "posting location information representing the location of the poster at the time the poster posted the message," which is associated with the posted message, is corrected based on the text of the posted message and the location history of the poster (S26, S28, and S29), and the posted message is provided based on the corrected posting location information (S63). Thus, in the case where the location information is associated with the message posted on the computer network, any mismatch between the text of the posted message and the location information associated with the posted message can be corrected. For example, in the case where the location of the poster at the time the poster posted the message is associated with the posted message, a more proper location of the poster according to the text of the posted message can be shown.

The location information associated with the posted message is corrected based on the poster location history that specifies the location of the poster up until a predetermined time ago before the time the poster posted the message. Thus, the poster location history to be processed can be limited to the history relating to the text of the posted message. This can reduce the processing load of a control section, and can reduce the possibility that the location information may be corrected to information representing a location that does not relate to the text of the posted message.

In the case where the posted message contains a word relating to a traffic condition, the posting location information is corrected to information representing a location where the poster encountered this traffic condition (S26 and S29). Thus, any mismatch between the place where the traffic condition contained in the posted message has occurred and the location information associated with the posted message can be corrected. As a result, when the posted message is provided, the user can properly know the place where the traffic condition contained in the posted message has occurred, and the reliability of the information can be increased.

In the case where the posted message contains a word relating to a travel status, the posting location information is corrected to information representing a location where the poster experienced traveling corresponding to this travel status (S28 and S29). Thus, any mismatch between the place where the travel status contained in the posted message is implemented and the location information associated with the posted message can be corrected. As a result, when the posted message is provided, the user can properly know the place where the travel status contained in the posted message occurs, and the reliability of the information can be increased.

Since the corresponding posted messages extracted based on the search conditions are provided, the posted messages required by the user can be properly provided.

The texts of the corresponding posted messages extracted based on the search conditions as well as the posting location information associated with the corresponding posted messages are provided. Thus, the posted messages required by the user can be properly provided together with the posting location information. Moreover, since there is no mismatch between the text of the posted message and the posting location information that are provided, more accurate information can be provided.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying inventive principles.

For example, in the present example, the posted message search center 2 performs S11 to S13 and S21 to S29 of the posted message information correction program (FIGS. 6 and 7), S41 and S42 of the poster location information obtaining program (FIG. 10), and S61 to S63 of the posted message providing program (FIG. 11). However, for example, the posted message information management center 3 or the communication terminal 7 may perform at least one or all of these steps. For example, if the posted message information management center 3 or the communication terminal 7 performs S11 to S13, S21 to S29, S41, S42, and S61 to S63, the posted message search center 2 is not required.

Although the present example is configured so that the posting location information associated with the posted message is corrected at the timing the message is posted, the posting location information may be corrected at a different timing. For example, the posting location information associated with each posted message stored in the posted message information DB 8 of the posted message information management center 3 may be corrected regularly (every 24 hours). The posting location information associated with the posted message to be provided may be corrected at the timing the user is provided with the information about the posted message.

In the present example, the location information representing the location of the poster at the time the poster posted the message (the posting location information) is used as the location information associated with the posted message. However, other location information may be associated with the posted message. As the location information, an administrative district, a link number, a facility ID, etc. instead of the location coordinates may be associated with the posted message.

Although the present example is configured so that the text of the posted message as well as the posting time the message was posted, the posting location information, the poster's ID, etc. are stored as the information about the posted message in the posted message information management center 3. However, only the text of the posted message and the posting location information may be stored in the posted message information management center 3.

Although the present example is configured to correct the posting location information based on the text of the posted message and the location history of the poster, the posting location information may be corrected by using traffic information such as vehicle information and communication system (VICS®) information. This allows the place of a traffic jam, the place of a traffic accident, etc. to be more accurately specified.

Although the present example is described with respect to an example in which the poster travels in the vehicle 5, the inventive principles are also applicable to the case where the poster travels by transportation other than the vehicle 5 (e.g., a train, a bicycle, or walking).

In the present example, the posted message search center 2 is configured to obtain the poster location history by obtaining information about the current location coordinates from each communication terminal 7 at predetermined time intervals (e.g., every 10 seconds). However, when a message is posted by the communication terminal 7, the posted message search center 2 may obtain from the communication terminal 7 the posted message as well as the information about the current location coordinates of the communication terminal 7 up until a predetermined time ago before the posting time. In this case, the poster location information obtaining program (FIG. 10) is not required.

What is claimed is:

1. A posted message providing system, comprising:
   a memory that stores a map information database; and
   obtains (i) a message previously posted on a computer network by a poster, and (ii) posting location information indicating the location of the poster at a time the poster posted the posted message;
   obtains a poster location history, the poster location history including specific previous locations of the poster obtained at predetermined intervals;
   compares the poster location history with the stored map information;
   corrects the posting location information associated with the posted message to a location representing an event referred to in the posted message based on a text of the obtained posted message and the comparison;
   communicates the posted message based on the corrected posting location information.

2. The posted message providing system according to claim 1, wherein the controller:
   corrects the posting location information associated with the posted message based on the specific locations in the poster location history up until a predetermined time before a time at which the poster posted the obtained message.

3. The posted message providing system according to claim 1, wherein when the obtained posted message contains a word relating to a traffic condition, the controller:
   determines a location where the poster encountered the traffic condition based on the poster location history; and
   corrects the posting location information to information representing the determined location.

4. The posted message providing system according to claim 3, wherein the controller:
   determines a travel speed of the poster based on the poster location history; and
   determines the location where the poster encountered the traffic condition as a location where the determined travel speed is less than a predetermined threshold speed.

5. The posted message providing system according to claim 1, wherein when the obtained posted message contains a word relating to a travel status, the controller:
   determines a location where the poster experienced the travel status based on the poster location history; and
   corrects the posting location information to information representing the determined location.

6. The posted message providing system according to claim 1, wherein the controller:
   obtains a search condition;
   extracts from a plurality of posted messages posted on the computer network the obtained posted message based on the obtained search condition.

7. The posted message providing system according to claim 1, wherein the controller:
   communicates the posted message by providing the text of the posted message and the posting location information associated with the posted message.

8. The posted message providing system according to claim 1, further comprising:
   a memory including a poster location database;
   wherein the controller obtains the poster location history from the poster location database.

9. The posted message providing system according to claim 1, further comprising a communication apparatus, wherein the controller:
   obtains the posted message via the communication apparatus; and
   after the posting location information is corrected, communicates the posted message via the communication apparatus.

10. A posted message providing method, comprising:
    accessing a memory that stores a map location database;
    obtaining (i) a message previously posted on a computer network by a poster, and (ii) posting location information indicating the location of the poster at a time the poster posted the posted message;
    obtaining a poster location history, the poster location history including specific previous locations of the poster obtained at predetermined intervals;
    comparing the poster location history with the stored map information;
    correcting the posting location information associated with the posted message to a location representing an event referred to in the posted message based on a text of the obtained posted message and the comparison;
    communicating the posted message based on the corrected posting location information.

11. The posted message providing method according to claim 10, further comprising:
    correcting the posting location information associated with the posted message based on the specific locations in the poster location history up until a predetermined time before a time at which the poster posted the obtained message.

12. The posted message providing method according to claim 10, further comprising, when the obtained posted message contains a word relating to a traffic condition:
 determining a location where the poster encountered the traffic condition based on the poster location history; and
 correcting the posting location information to information representing the determined location.

13. The posted message providing method according to claim 12, further comprising:
 determining a travel speed of the poster based on the poster location history; and
 determining the location where the poster encountered the traffic condition as a location where the determined travel speed is less than a predetermined threshold speed.

14. The posted message providing method according to claim 10, further comprising, when the obtained posted message contains a word relating to a travel status:
 determining a location where the poster experienced the travel status based on the poster location history; and
 correcting the posting location information to information representing the determined location.

15. The posted message providing method according to claim 10, further comprising:
 obtaining a search condition;
 extracting from a plurality of posted messages posted on the computer network the obtained posted message based on the obtained search condition.

16. The posted message providing method according to claim 10, further comprising:
 communicating the posted message by providing the text of the posted message and the posting location information associated with the posted message.

17. The posted message providing method according to claim 10, further comprising:
 obtaining the poster location history from a poster location database.

18. The posted message providing method according to claim 10, further comprising:
 obtaining the posted message via a communication apparatus; and
 after the posting location information is corrected, communicating the posted message via the communication apparatus.

19. A non-transitory computer-readable storage medium storing a computer-executable posted message providing program, the program comprising:
 instructions for accessing a memory that stores a map information database;
 instructions for obtaining (i) a message previously posted on a computer network by a poster, and (ii) posting location information indicating the location of the poster at a time the poster posted the posted message;
 instructions for obtaining a poster location history, the poster location history including specific previous locations of the poster obtained at predetermined intervals;
 instructions for comparing the poster location history with the stored map information;
 instructions for correcting the posting location information associated with the posted message to a location representing an event referred to in the posted message based on a text of the obtained posted message and the comparison;
 instructions for communicating the posted message based on the corrected posting location information.

\* \* \* \* \*